United States Patent
Adleman et al.

(10) Patent No.: US 6,920,288 B2
(45) Date of Patent: Jul. 19, 2005

(54) METHOD FOR AUTOMATICALLY PROVISIONING A NETWORK ELEMENT

(75) Inventors: Richard Adleman, Colts Neck, NJ (US); Peter L. Bartman, Dover, NJ (US); Heribert J. Blach, Matawan, NJ (US); Janet M. Greenberg, Freehold, NJ (US); Mile Radovanovic, Morganville, NJ (US); David A. Sadler, Holmdel, NJ (US); Mary Socratous, Colts Neck, NJ (US); Scott D. Young, Holmdel, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 643 days.

(21) Appl. No.: 10/093,847

(22) Filed: Mar. 8, 2002

(65) Prior Publication Data

US 2004/0208528 A1 Oct. 21, 2004

(51) Int. Cl.[7] .................. H04J 14/02; H04B 10/08; H04B 17/00
(52) U.S. Cl. .................. 398/83; 298/25; 298/30; 298/33
(58) Field of Search .................. 398/83, 25, 30, 398/33

(56) References Cited

U.S. PATENT DOCUMENTS

| | | | |
|---|---|---|---|
| 6,782,199 B1 | * | 8/2004 | Ye et al. ........... 398/10 |
| 2002/0101635 A1 | * | 8/2002 | Taketomi ........... 359/124 |
| 2002/0186432 A1 | * | 12/2002 | Roorda et al. ........... 359/128 |

* cited by examiner

Primary Examiner—M. R. Sedighian
Assistant Examiner—Quan-Zhen Wang

(57) ABSTRACT

Embodiments of the invention generally provide a method for automatically detecting and provisioning new optical connections in a network element (NE). The detection of the optical connections is generally accomplished via optical scans, and in particular, an optical spectral analysis type scan, which may be conducted at specific times and at specific points within the NE in order to determine an association corresponding to a new connection through the NE. The automatic detecting in provisioning method of the invention may generally be implemented on connections in end terminals (ET), as well as connections in optical add/drop multiplexer (OADM) NEs. As such, embodiments of the invention allow for automatic detection and provisioning of optical circuit packs in an optical line system (OLS) based upon optical scans configured to detect the presence of valid incoming client signals through the NE.

24 Claims, 4 Drawing Sheets

METHOD FOR AUTOMATICALLY PROVISIONING A NETWORK ELEMENT

BACKGROUND OF THE INVENTION

1. Field of the Invention

The present invention generally relates to optical network systems and, more particularly, to a method of automatically provisioning elements added to an optical network system.

2. Background of the Related Art

Data communication networks such as optical line systems are continually increasing in both size and complexity. As these networks and systems increase in size, the network management functions proportionally increase in complexity. This means that the critical tasks of network management, such as provisioning (allocating resources to form a communications link), restoration, reinstatement, and such are also further complicated as networks and systems grow.

It is becoming increasingly difficult to efficiently provision optical line systems (OLSs), since the number of fibered connections in a typical OLS may take days to manually provision. Aside from the initial provisioning that is required for an OLS, as additional network elements are added to the OLS, additional provisioning functions must also be entered into a database of associations. In the past, users entered these associations, which were generally called interpack connections, into the system database via TL1 commands entered from a craft interface terminal (CIT) or element management system (EMS). However, manual entry of the commands was very time consuming and prone to error, since the process could easily take several hours and require several hundred commands to be entered for the addition of a single network element.

SUMMARY OF THE INVENTION

The present invention addresses the deficiencies in the art noted above by providing a method for automatically provisioning network elements. Specifically, the method for automatically provisioning a channel added to a network element of an optical line system comprises receiving a client signal at an optical translator pack in the network element, determining a channel wavelength corresponding to the client signal, determining if the client signal is present on a line side of the network element in a laser off scan process, determining if the client signal is present on the line side of the network element in a laser on scan process, and adding a point to point connection association for the optical translator to a database of associations for the optical line system if the client signal is determined not to be present during the laser off scan and is determined to be present in the laser on scan.

Embodiments of the invention generally provide a method for automatically detecting and provisioning new optical connections in a network element (NE). The detection of the optical connections is generally accomplished via optical scans, and in particular, an optical spectral analysis type scan, which may be conducted at specific times and at specific points within the NE in order to determine an association corresponding to a new connection through the NE. The automatic detecting in provisioning method of the invention may generally be implemented on connections in end terminals (ET), as well as connections in optical add/ drop multiplexer (OADM) NEs. As such, embodiments of the invention allow for automatic detection and provisioning of optical circuit packs in an optical line system (OLS) based upon optical scans configured to detect the presence of valid incoming client signals through the NE.

Embodiments of the invention may further provide a method for automatically provisioning a channel added to a network element of an optical line system. The method generally includes receiving a client signal at an optical translator pack in the network element, determining a channel wavelength corresponding to the client signal, and determining if the client signal is present on a line side of the network element in a laser off scan process. Additionally, the method may include determining if the client signal is present on the line side of the network element in a laser on scan process, and adding a point to point connection association for the optical translator to a database of associations for the optical line system if the client signal is determined not to be present during the laser off scan and is determined to be present in the laser on scan.

Embodiments of the invention may further provide a method for autoprovisioning a newly fibered connection for an optical line system. The method generally includes receiving an optical signal in a network element, determining if a previously existing association exists for the optical signal in a system association database, and determining an association corresponding to the optical signal if a previously existing association does not exist. The association determination step may include the steps of conducting a laser off scan process, conducting a laser on scan process, and determining the association corresponding to the optical signal from results of the laser off and laser on scan processes.

Embodiments of the invention may further provide a method for autoprovisioning a newly fibered end terminal in an optical line system. The method may include the steps of receiving a client signal in an optical translator of the end terminal, reading an apparatus code of the optical translator to determine a channel wavelength of the client signal and determining a corresponding optical multiplexer port therefrom, and determining if a previously existing association exists for the client signal in a system association database. Additionally, the method may include turning a laser in the optical translator off and conducting an optical spectrum analysis on an optical output of a line side of the end terminal to determine if the client signal is present, turning the laser in the optical translator on and conducting an optical spectrum analysis on the optical output of a line side of the end terminal to determine if the client signal is present, and determining a point to point fiber connection association corresponding to the client signal from results of the optical spectrum analysis.

BRIEF DESCRIPTION OF THE DRAWINGS

In order to better understand the above recited features of the present invention, a more particular description of the invention may be had by reference to the exemplary embodiments thereof, which are illustrated in the appended drawings. It is to be noted, however, that the appended drawings illustrate exemplary embodiments of the invention, and are therefore, not to be considered limiting on its scope, as alternative embodiments of the invention may be derived without departing from the true scope thereof.

DETAILED DESCRIPTION OF THE PREFERRED EMBODIMENT

Figure 1:
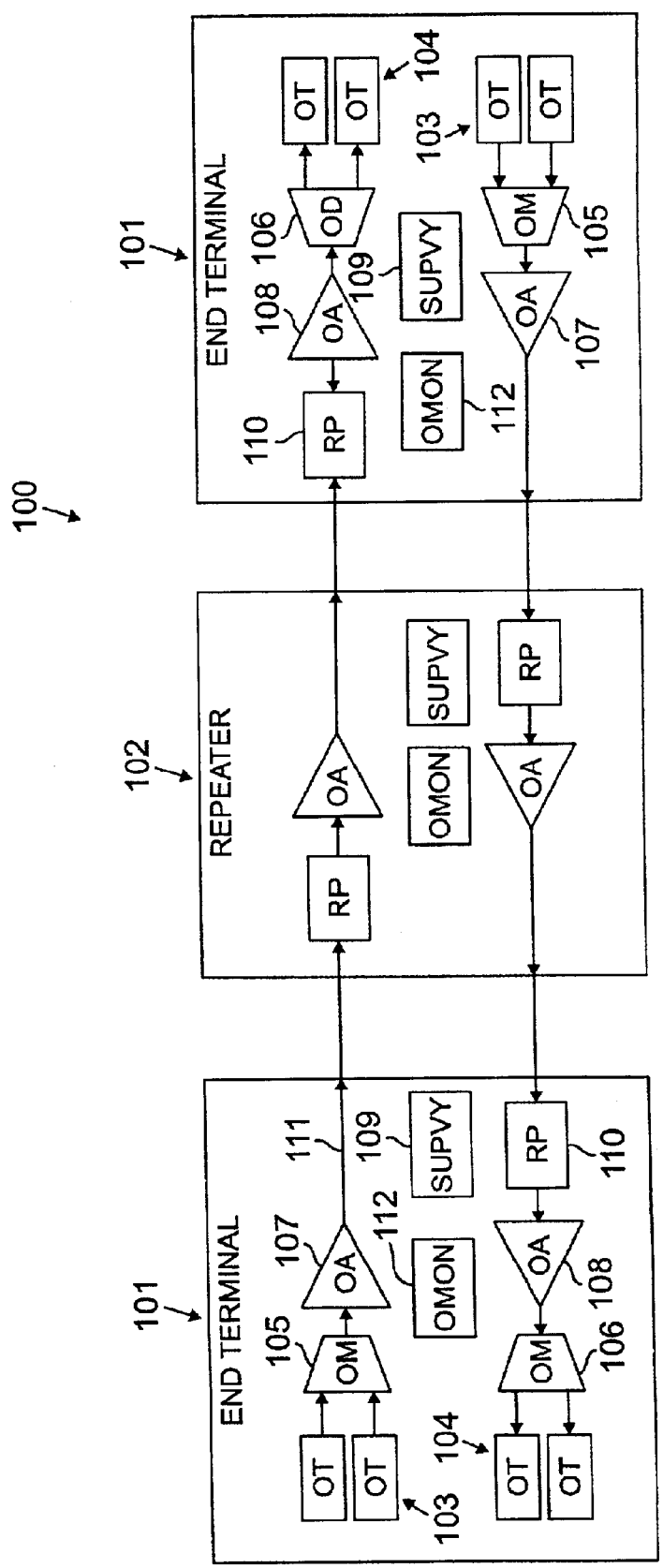
FIG. 1 illustrates a simplified exemplary optical transport platform capable of implementing a method according to the invention.

FIG. 1 illustrates a simplified exemplary optical transport platform 100 capable of implementing a method according to the invention. Platform 100 includes a plurality (e.g., two) of end terminals (ET) 101 and one or more repeaters 102 positioned therebetween. Optical signals transmitted between the respective ETs 101 may be amplified or boosted during the transmission phase between the respective ETs 101 by repeater(s) 102, so that the signal arriving at the receiving ET 101 maintains a sufficient magnitude.

Each of the respective ETs 101 may generally include one or more transmission/add/drop side optical translators (OT) 103, 104 (which are also called OT packs) in optical communication with at least one optical multiplexer (OM) 105. The OTs 103,104 are generally used to convert micron region wavelengths from customer equipment, illustratively 1.3 to 1.55 micron wavelengths, to the appropriate wavelengths and bit rates for use in the optical transport platform 100 and, in particular, for use in an ET 101. As such, OTs 103, 104 are generally positioned at the exit and entry points of the respective ETs 101.

The OM 105 generally operates to receive optical signals having various wavelengths from the respective OTs 103, 104 and combine the respective signals and transmit the combined signals on a common optical fiber. The output of OM 105 is generally in optical communication with the input of an optical amplifier (OA) 107.

The OA 107 generally operates to amplify the multiwavelength signal for transmission on an optical fiber 111. As such, optical amplifiers are often used at the transmit end and receiving end of an optical line, as well as within intermediate repeater sites 102.

The drop/receiving side of an ET 101 generally includes a raman pump (RP) 110 in optical communication with a line side OA 108. The RP 110 is generally a copropagating or counterpropagating optical pump configured to provide gain in the outside plant fiber via stimulated raman scattering. Generally, both copropagating and counterpropagating raman pumps are included in OA packs. Additionally, growth-type raman pumps (not shown) may be added to platform 100 as the system grows via addition of elements and/or packs. The line side OA has an output in optical communication with a line side optical demultiplexer (OD) 106. The OD 106 generally operates to separate the multiple wavelengths of optical signals that are present on the common optical fiber coming in through the RP 110 and OA 108. The OD separates the multi-wavelength optical signal into individual channels, which are generally output on individual optical fiber channels. The output fibers of OD 106 are generally in optical communication with one or more line side OTs 104 that convert the received wavelength into a preferred wavelength for processing in the respective OT 104.

Each of the respective ETs 101 optionally includes one or more control mechanisms/systems configured to regulate and/or control the ET operation and ET communication with external devices. ETs 101 generally include a supervisory pack (SUPVY) 109 and an optical monitor (OMAN) 112. The SUPVY 109 is generally used to control functions such as node-to-node communications, APSD recovery (automatic power shut down), APR (automatic power reduction) recovery and the like. The OMAN 112, generally termed OMAN packs 112, are configured to analyze signals tapped at several critical locations within the ET 101 and allow the control system to set the various control parameters to the appropriate values in support of the overall transmission process. In particular, OMAN 112 generally includes an optical spectrum analyzer configured to analyze optical signals. Additionally, each of the respective ETs 101 generally include multiple levels of software operating thereon to control the operation thereof, and further, to control the provisioning process involved with the addition of elements or packs to the platform 100 after platform 100 is originally configured and brought online.

The software or control systems of the present invention generally reside at multiple levels of platform 100. For example, as noted above, a spectrum analyzer process used in channel detection and autodiscovery is generally controlled by the OMAN 112. Additionally, software running on the individual OT packs, generally termed FltSupOT herein, may operate to control the operation of the OT packs, as well as a line side laser in the respective OT packs, which may also be used for the autodetection and provisioning processes. Another level of software running on an end terminal (ET) network element (NE) control pack, which is generally termed OptConDir, may be used to control the general functionality of the autodiscovery processes. Yet another level of software running on the NE control pack (NCTL), generally termed OsaDir, may operate to generally control optical scans via the OMAN pack 112, for example. This particular software level may operate to process requests from other software objects on the NE, assign a priority to every incoming request and queue them accordingly, and allocate the OMAN pack as soon as it becomes available to the highest priority event in queue.

Generally, since the OMAN is a shared resource and correction of packet transmission problems is handled with the highest priority, non-transmission tasks are handled with the second highest priority, while modification to existing transmission parameters and periodic monitoring are handled with lower priorities. Additionally, the OMAN software generally allows for optical parameter measurements within the system, such as, for example, per channel power and wavelength, number of channels, signal bandwidth, total power, tilt and the like. Further, the OMAN pack interacts with optical spectrum analyzer (OSA) hardware to perform spectral scans, to process the scan data, in for the scan data to the OsaDir software. More particularly, the OMAN software may be divided into two controls: first, an optical selector control; and second, the OSA control. Since the OMAN is time shared across multiple signal traps, the input selector on the OMAN, illustratively, allows up to four or eight monitor points to be observed by one OMAN pack. As such, generally, approximately 125 milliseconds are allowed for the operation of the switch to select the input port. The OMAN spectrum analyzers (OSAs) are generally capable of scanning the entire extended L-band spectrum in 100 milliseconds. Therefore, spectral measurements generally occur periodically, or whenever application software objects request OMAN scans.

In one embodiment, the autodiscovery and provisioning process of the present invention begins when software running on the OT packs 103, 104, the FltSupOT, determines that a new and valid client signal has been received therein. At the instant when a new and valid client signal is received in the respective OT packs 103, 104, the line side laser positioned within the respective OT packs 103 is generally in the off position. At this time, the FltSupOT software running on the OT pack that has received the new and valid client signal sends a signal to the OptConDir control software running on the NE control pack requesting the initiation of an autodiscovery process to determine the provisioning parameters for the new optical channel. The NE control pack software receives the request to initiate the autodiscovery and provisioning process, initiates the necessary variables for the discovery process, and begins the channel discovery processes. The channel discovery process, which will be further discussed herein, generally includes verifying that the new client signal does not correspond to a preexisting provisioned channel, and determining the associations for the newly fibered connection via an optical scanning process. Once the associations for the newly fibered connection are determined in the scanning process, the associations may be input into an association database for the platform 100.

Figure 2:
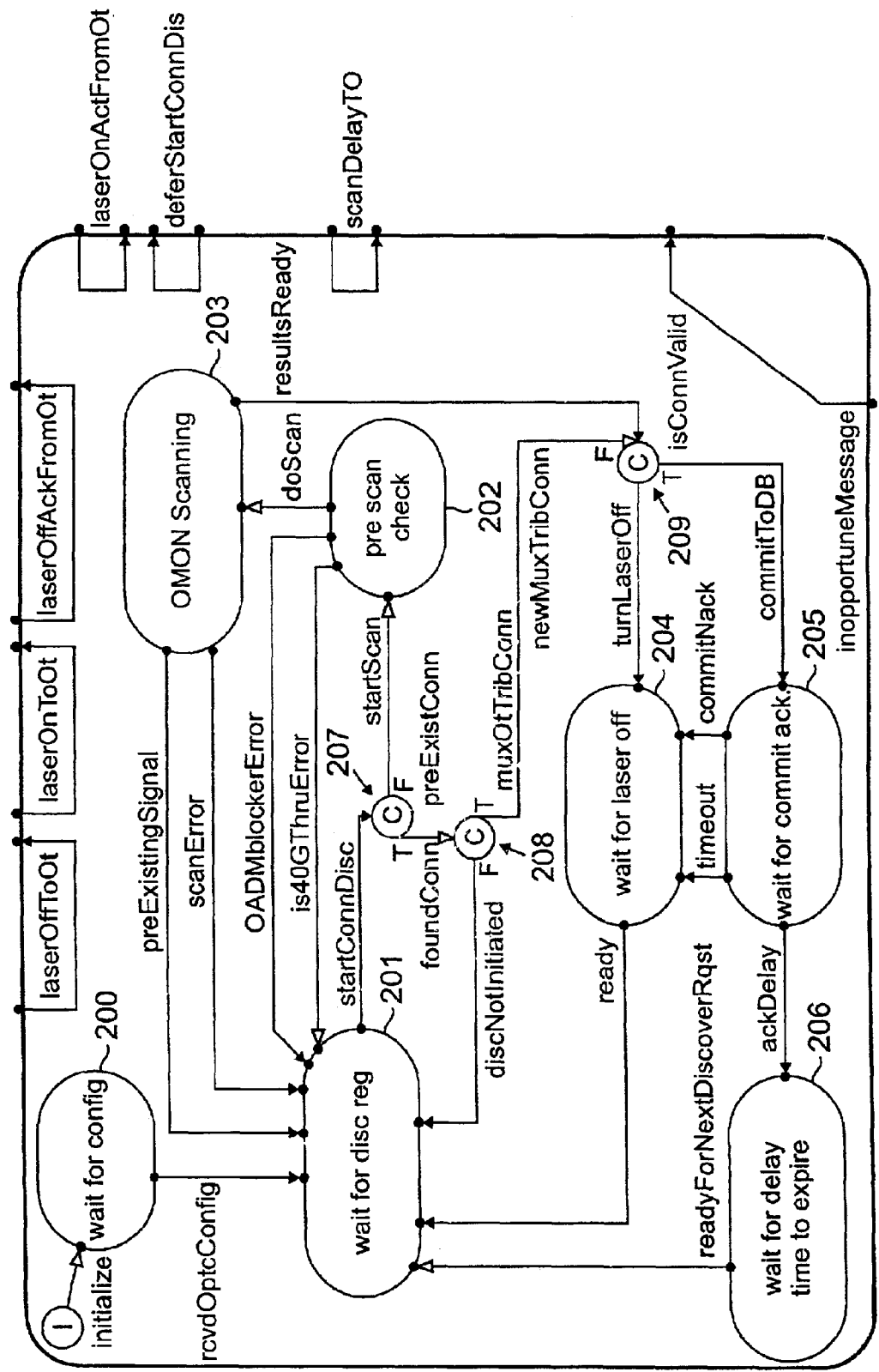
FIG. 2 illustrates a flowchart of an exemplary autodiscovery and provisioning process of the present invention.

FIG. 2 illustrates a more detailed flowchart of the autodiscovery and provisioning process of the present invention. The auto discovery process generally begins with a configuration step 200, wherein the respective elements and objects of the autodiscovery and provisioning software are configured for operation. Once configuration step 200 is completed, the method continues to step 201, where the OptConDir software is in a "wait" state waiting for a channel discovery request. Once a discovery request, generally denoted by a "startdiscovery" instruction from the FltSupOT software, is received by the OptConDir software, the OptConDir software begins to initialize variables in the software package necessary to conduct the discovery process.

While the OptConDir software is initializing, the method determines if a preexisting connection exits at the frequency of the newly fibered connection corresponding to the new client signal discovered at the respective OT, as illustrated by step 207. If a preexisting connection is determined to exist at step 207, the method further determines if the preexisting connection is a special case or an error condition at step 208. If the connection is a special case, the method continues to another determination step 209, where the method determines if the connection is valid, which will be further discussed herein. If the determination is not that the connection is a special case at step 208, then the method determines an error exists and returns to the "wait for discovery" request at step 201 without continuing with the channel discovery and provisioning process.

If it is determined after step 201 that there is no preexisting connection at the new client signal wavelength, then the method initiates a scanning process via a prescan check at step 202. The prescan check step 202 generally operates to validate the conditions and variables necessary for the scanning process, as well as checking for the special cases that are related to OADM blocker logic and discovery of THRU OTs, which require special scan handling as they are generally the only OTs in the system that do not add and drop the client signal on the same physical OT pack. As such, the presence of an additional pack to handle the OADM THRU signals requires an additional verification step before the autodiscovery process may continue. Thus, if a scan error or a pre-existing signal is determined at the OMAN scanning step 203, within the method exits out of the scanning stage in returns to the "wait for discovery" request at step 201.

Once the prescan processing is completed at step 202, the method continues to step 203 where an OMAN scanning process in conducted. The OMAN scanning process, which will be further described herein with respect to FIG. 3, generally includes performing a series of laser off scans for a particular wavelength, and then conducting the same scans with the laser in an "on" state. The idea is that with the OT laser off, the method knows that the line side scanning at the transmit OA should not find a valid signal for the particular client signal grid frequency supported by the OT that the method is trying to discover. Embodiments of the invention contemplate conducting these scans on the OM packs OMON port immediately before the fiber connecting the OM to the transmit OA. Therefore, conceptually, the present invention may scan the transmit OA, while physically, the invention may be scanning on the transmit OM. Thus, if the client signal grid frequency is not discovered during the laser off scanning stage, then the OT laser may be turned on, and the scan may be repeated to confirm that the client signal grid frequency is now present with the OT laser in the on position. If either the client signal frequency is present during the laser off stage or the client signal frequency is not present during the laser on stage, then the logic returns to step 201, as an error has generally occurred during the scanning process. However, in the situation where an error is encountered during autodiscovery, the present invention may be configured to identify and report the error to the software and the users of the system. This feature may generally assist installers in pinpointing the root cause of errors that may have conventionally required substantial time to locate. For example, if a bad fiber or dirty optical connector is used, this could cause the signal not to be found during the laser on scan, thus resulting in a "missing component alarm" in the present invention, whereas conventional fibering techniques would require testing of all components in the optical signal path to determine where the faulty component or problem is located.

Alternatively, if the OMAN scanning process does not find the client signal frequency in the laser off stage and does find the client signal frequency during the laser on stage, then the scanning stage 203 indicates that the scanning results are ready and continues to determine if the connection is valid at step 209. If the connection is not determined to be valid, and the method continues to step 204 where the OT laser is turned off. Thereafter, the method returns to step 201 and waits for the next discovery request. Alternatively, and if the connection is determined to be valid, then the method both continues to step 205 where the determined connection is committed to an association database configured to store connection associations representative of the individual fiber connections within the platform 100, and the OT laser is left in the on position. Once the determined associations are committed to the database, the method continues to step 206, where a delay is implemented prior to returning to step 201 and waiting for the next discovery request.

Figure 3:
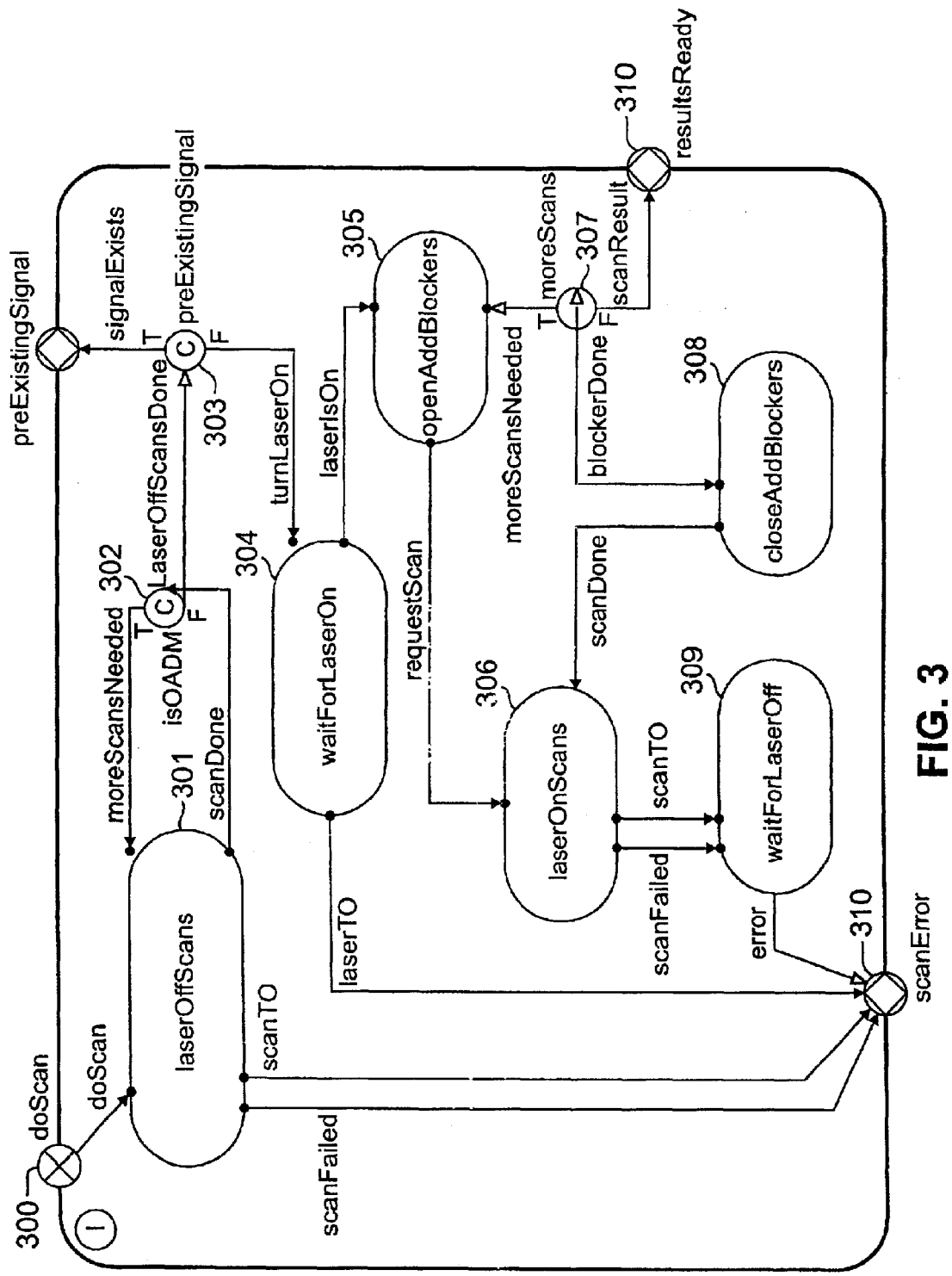
FIG. 3 illustrates a flowchart of an exemplary optical scanning process of the invention.

FIG. 3 illustrates a flowchart of an exemplary scanning process of the invention. As briefly noted above, the scanning processes of the present invention generally includes a laser "off" scanning stage and a laser "on" scanning stage. The present invention generally implements the laser off scans prior to the laser on scans, although the invention is not limited to such configurations. The exemplary scanning process illustrated in FIG. 3 begins at step 300, where the software is given the instruction "doscan," which corresponds to the initiation of a scanning process from step 203 in FIG. 2. The new scan step 300 leads to step 301, where the laser off scans are conducted.

The laser off scans at step 307 generally include scanning each of the channels of the respective OTs of the platform for the newly discovered valid client signal, however, the scanning process is conducted with the OT laser in the off position. As such, if the newly discovered client signal is fibered correctly, and no errors occur during scanning process, then the scanning process for the new client signal with the laser in the off position will not discover the new client signal. When the laser off scan is completed, the method continues to step 302, where the software determines if additional laser off scans are needed, i.e., if the current configuration is an OADM configuration. If the configuration is determined to be an OADM configuration, then the method returns to step 301 for additional laser off scans. For example, an OADM type NE generally supports adding and dropping channels on both its east and west lines (as opposed to an ET type NE which generally only supports an east line). Thus, at an OADM, autodiscovery processing of a newly added OT on an OADM NE is performed on both the east and west lines. Alternatively, if step 302 determines that the current configuration is not an OADM configuration, then the laser off scans are completed, and the method continues to step 303 where the software validates that it did not find a signal during the laser off scan.

Once the validation processes of step 303 are complete, assuming that the results of the laser off scans are valid, the method continues to step 304, which corresponds to the beginning of the laser on scan process. During the transition from step 303 to step 304, the software generally communicates with the respective OT to turn the OT laser on and begin transmitting the newly discovered client signal through the network. Therefore, step 304 is configured to wait for the OT laser to power up, stabilize, and begin transmitting the desired optical signal.

Once the OT laser is on, the method continues to step 305, which is configured to address configurations dealing with OADM blockers, which will be further discussed herein. Once the steps related to the handling of OADM blockers are conducted, the method continues to step 306, where the laser on scans are initiated. The laser on scans are generally configured to scan each channel of the OTs for the frequency of the newly discovered valid client signal. If any errors are encountered during the scanning process, the method continues from step 306 to step 309, where the OT laser is powered down and the method is terminated in a scan error state. If the laser on scans are successful, the method continues from step 306 to step 308, where the add blockers may be closed if the signal was not detected and the method continues to step 307.

At step 307 method determines if more scans need to be conducted, and if so, the method continues to step 305, where the add blockers are again opened in preparation for the laser on scans a step 306. Alternatively, if the determination at step 307 indicates that no more scans are required, i.e., as will be the situation when ETs are scanned as they will always only require one scan, the method continues to step 310, which represents the step where scan results are ready for analysis.

Additionally, with regard to the laser on scans, the present invention contemplates performing the laser on scans on the OM, before the signal leaves the OM. This is conceptually similar to scanning on the transmit OA, however, various implementations may allow for and/or favor conducting the scans at the OM output as compared to the transmit OA. For example, before the first channel of the transmit OA is added the pumps are off, so the system turns on high power pumps before it can even know if there is a valid channel. Another challenge associated with the OT lasers is the stabilization. Generally, for example, when the laser is first turned on, the output power fluctuates, which can destabilize the system. Therefore, the present invention contemplates implementing monitoring and correction algorithms configured to detect and compensate/correct for these laser power fluctuations.

With regard to the scanning processes, it is to be noted that the scanning processes of the present invention may include selective control over VMUXs which are in optical communication with the OMs of the platform. Generally, a VMUX is illustratively a 32 channel attenuation device that resides at the input of every OM pack. Like the blocker, VMUXs are generally used to "block" an optical signal from entering the OM for a channel where there is not connection, and additionally, flatten the OT input signal power for channels where there are connections. Note that depending on an OT lasers age, the output power therefrom may vary by +/−2 dB. However, the output from the OMs should generally be flat, and therefore VMUXs are used as per channel attenuators to flatten the OT signal powers. As such, with the VMUXs located at the inputs of the OMs, they will generally operate to attenuate individual OT power levels, such that what is coming out of the VMUXs is flat. Therefore, during the laser-off and laser-on scans of the autodiscovery method of the invention, the software may partially open and close the VMUXs in order to allow any new signals through to the scan points. The VMUX control operations may occur as a sub-process of the "laserOnScan" step, the "openAddBlocker" step, and/or the "closeAddBlocker" steps, for example.

Once the scan results are ready for analysis, the software of the present invention may generate one or more associations that are representative of the fibered connections of the newly discovered client signal. These associations, which generally correspond to the manually entered commands of conventional provisioning processes, maybe entered into an association database that is utilized by the platform 100. As such, the autodiscovery and provisioning process of the present convention eliminates the need for manual entry of the associations representative of a newly fibered connection, which dramatically decreases the amount of time required to add a new channel, as well as dramatically increasing the accuracy of the associations that are representative of the newly fibered connection.

As noted above, autodiscovery and provisioning processes on OADM nodes is more complicated than the ETs, as OADM nodes interact with two lines (east and west) and implement "blockers" on OADM OD and OM packs. The fact that OADM nodes interacts with two lines modifies the scanning algorithm, since a new OT may be connected to either the east or the west side of the optical path. Therefore, the software of the present invention may no longer perform one laser off and one laser on scan to discover the fiber connection. More particularly, OD blockers are generally devices that are used to direct optical traffic through an NE, as opposed to simply adding or dropping it, as ETs do. Therefore, if optical traffic is directed through the NE, then a signal received on the east side is pass-through is then sent out on the west side, and vice versa. Alternatively, and optical signal/channel is added or dropped, the channel is terminated at an OT with the NE and does not pass-through the NE. In other words, data received on the east side does not get switched through the west side, but rather, is terminated at some customer equipment. The OD blockers are on a per channel/frequency basis, and the position of the OD blockers is provisioned manually. If an OD is in the through position for a particular frequency, and autodiscovery request for the frequency has to be denied, as when a channel is switched through that NE, the software must not automatically provision a new connection for that channel. As such, manual provisioning of the OD blockers entails complex processing, as for example, any add/drop connection for a frequency needs to be automatically deleted when the OD blockers for the particular frequency are provisioned from the add/drop position to the through position.

OM blockers are essentially the same devices as OD blockers, but serve different purposes, as they are generally used to control whether a signal is allowed to pass through the OM. OM blockers are generally per frequency and line, so if an OM blocker for a first frequency line going east is closed, for example, a customer signal fibered into the east line of the OM at the first frequency will be blocked from passing through the OM as a result thereof. As such, OM blockers generally ensure that the through signals are not destroyed by client signals mistakenly fibered into the corresponding OM. When the OD blocker for a given frequency is in the through position, both OM blockers for that frequency must be in the block position. If, however, the OD blocker of a frequency is in the add/drop position, the position of the OM blockers depends upon whether a connection is provisioned for that particular line and frequency. Therefore, the autodiscovery process of the present invention is used to automatically provision such connections, via provisioning OM blockers through a result finding/entering process for the new connection.

Therefore, in view of the properties of OM blockers, it is apparent that a client signal will not be detected at the transmit OA, unless the OM blocker for that particular frequency/line is open. As such, when the method of the president invention conducts the laser off scans for an OADM node (see FIG. 3), the software needs to perform the scans at OM packs before the OM blockers, instead of at the transmit OA, as with ETs. This is generally because with the OM blocker closed, a scan at the transmit OA would not show any signal, even if a signal was mistakenly plugged into the OM input port for that particular frequency. Since the method of the present invention performs the laser on scans at the transmit OA, the OM blocker should be open before performing this scan. The OM blocker may be opened in step 305 of FIG. 3, and similarly, if no valid client signal is determined during the laser on scans, the OM blockers should be closed, as illustrated in step 308.

Figure 4:
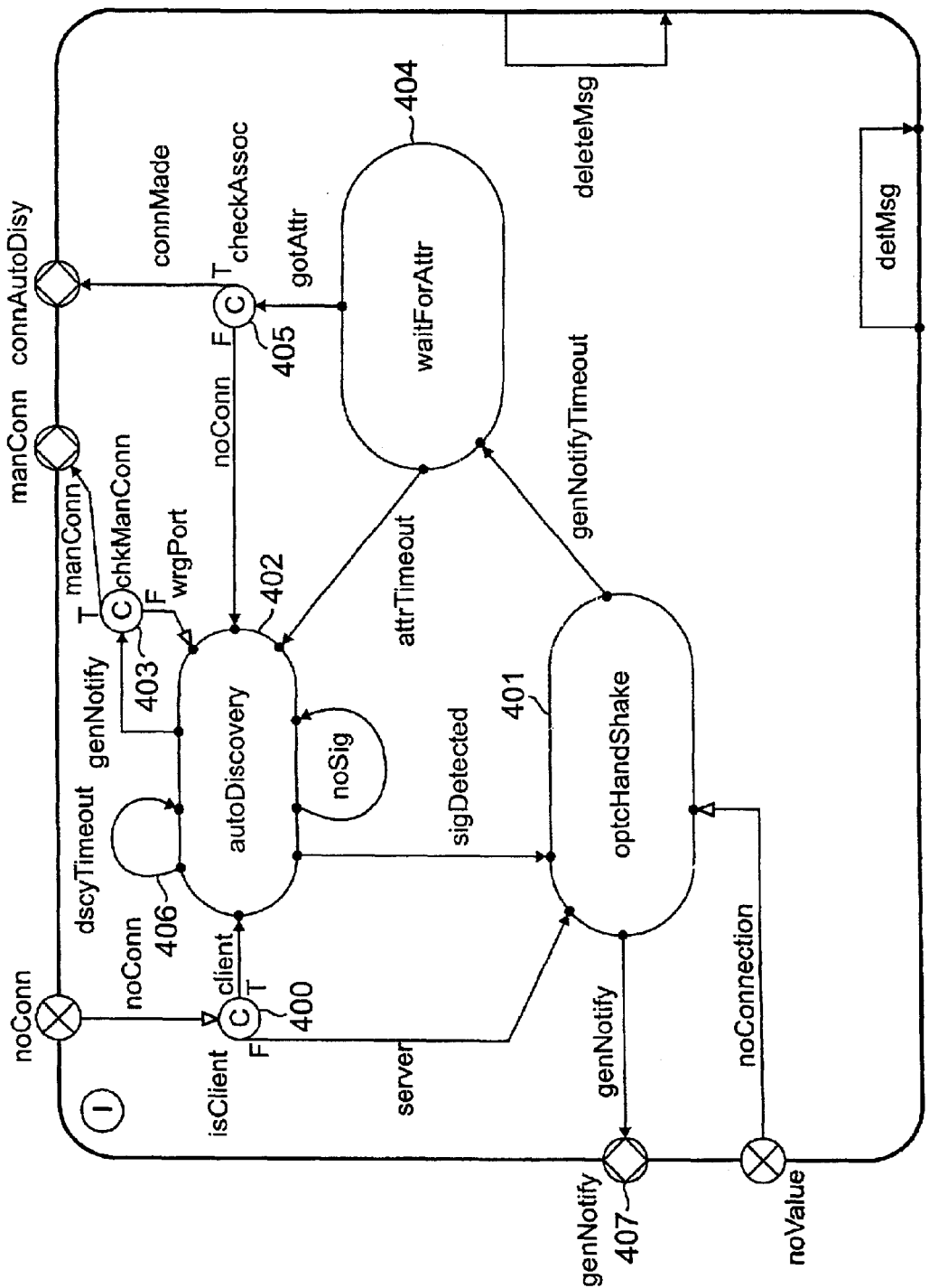
FIG. 4 illustrates a flowchart of an exemplary method for detecting a valid client signal of the invention.

Returning to the general description of the method of the present invention, FIG. 4 illustrates another flowchart of an embodiment of the valid client signal detection of the invention. Beginning at step 400, when an OT pack is first booted or initiated without a pre-existing connection, an object in the software (portSup) checks to determine an input port that can be auto-discovered should be monitored. The object associative with the line/port enters step 401 (the handshake state) waiting for a connection to be made either automatically or manually. Alternatively, if a port can be auto-discovered is found at step 400, the object associated with the client signal enters the autodiscovery state 402 after setting a periodic timer to initiate the client signal detection sequences, as illustrated by loop 406. When the time or delay 406 expires, the object generally initiates an infrastructure call to access the hardware used to determine if a valid client signal is present. The determination of whether or not a valid signal is present may generally include determining if the optical signal has sufficient magnitude, does not have LOS or LOF, and is of a bit rate compatible with the OT. If the signal is determined to be valid, the method continues to the optical handshake step 401. Alternatively, if the signal is not valid, it will remain in the autodiscovery step 402, or alternatively, if the signal of the sufficient magnitude and an LOS and/or LOF condition exists, then an alarm will be issued. When a valid connection has been determined to be present by the OptConDir object of the network element control, the portSup object will be notified in exit the handshake state 401 and resume the state monitoring of the client port, i.e., exit the autodiscovery process at step 407, as the discovery process for the OT pack has concluded. Step 404 in FIG. 4 (waitForAttr) is used when the portSup object times out while waiting for the connection verification. In this state, the portSup object will query the database to determine if a connection was made, but failed to receive confirmation, or no connection was made in the portSup object should re-enter the honor discovery step 402 to resume monitoring for a valid client signal. If the OT pack is not connected properly to other components in the system and the OptConDir object has raised then alarm to indicate this condition, then the portSup object will notified the OptConDir object when the client signals removed. The OptConDir object will then clear the alarm and are discovery can resume once the proper connections are made in the power is turned back on in the respective OT pack.

While foregoing is directed to exemplary embodiments of the present invention, other and further embodiments of the invention may be devised without departing from the basic scope thereof, wherein the scope is to be determined by the clams that follow.

What is claimed is:

1. A method for automatically provisioning a channel added to a network element of an optical line system, comprising:

receiving a client signal at an optical translator pack in the network element;

determining a channel wavelength corresponding to the client signal;

determining if the client signal is present on a line side of the network element in a laser off scan process;

determining if the client signal is present on the line side of the network element in a laser on scan process; and adding a point to point connection association for the optical translator to a database of associations for the optical line system if the client signal is determined not to be present during the laser off scan and is determined to be present in the laser on scan.

2. The method of claim 1, wherein determining the channel wavelength comprises reading an apparatus code of the optical translator pack.

3. The method of claim 1, wherein determining the channel wavelength further comprises determining a corresponding optical multiplexer port corresponding to the channel wavelength.

4. The method of claim 1, wherein determining if the client signal is present on a line side of the network element in a laser off scan and a laser on scan processes further comprises conducting an optical monitoring scan at the output of a transmit optical amplifier in optical communication with the optical translator.

5. The method of claim 1, wherein the laser off scan process comprises turning a signal transmission laser in the optical translator pack off and conducting an optical spectrum analysis on an optical output of a line side of the network element to determine if the channel wavelength is present.

6. The method of claim 1, wherein the laser on scan process comprises turning a signal transmission laser in the optical translator on and conducting an optical spectrum analysis on an optical output of a line side of the network element to determine if the channel wavelength is present.

7. The method of claim 1, wherein the network element is an end terminal of an optical line system having bi-directional optical translators.

8. The method of claim 7, wherein adding the point to point connection association further comprises adding an add association and a corresponding drop association to the database of associations.

9. The method of claim 1, wherein the network element has more than one line through the network element.

10. The method of claim 9, further comprising repeating the laser off and laser on scanning processes to determine point to point connection associations for each of the more than one lines through the network element.

11. The method of claim 1, further comprising generating an error condition if the client signal is determined to be at least one of present during the laser off scan process and not present during the laser on scan process.

12. A method for autoprovisioning a newly fibered connection for an optical line system, comprising:
  receiving an optical signal in a network element;
  determining if a previously existing association exists for the optical signal in a system association database; and
  determining an association corresponding to the optical signal if a previously existing association does not exist, wherein determining the association comprises:
    conducting a laser off scan process;
    conducting a laser on scan process; and
    determining the association corresponding to the optical signal from results of the laser off and laser on scan processes.

13. The method of claim 12, further comprising:
  determining a channel wavelength corresponding to the optical signal by reading an apparatus code of a corresponding optical translator pack; and
  determining an optical multiplexer port corresponding to the channel wavelength.

14. The method of claim 12, wherein determining if a previously existing association exists comprises cross referencing at least one of the wavelength of the client signal and a port number for a corresponding optical multiplexer with entries in the system association database.

15. The method of claim 12, wherein conducting a laser off scan process comprises:
  turning a transmission laser in a line side optical translator off; and
  conducting an optical scan for the frequency of the optical signal at an output of a transmit optical amplifier in optical communication with the optical translator.

16. The method of claim 15, further comprising:
  determining if the newly fibered connection is an OADM connection; and
  conducting an additional laser off scan process if the newly fibered connection is determined to be an OADM connection.

17. The method of claim 12, wherein conducting a laser on scan process comprises:
  turning a transmission laser in a line side optical translator on; and
  conducting an optical scan for the frequency of the optical signal at an output of a transmit optical amplifier in optical communication with the optical translator.

18. The method of claim 17, further comprising at least one of opening add blockers prior to conducting the optical scan and closing the add blockers after conducting the optical scan, and opening VMUXs prior to conducting the optical scan and closing the VMUXs after conducting the optical scan.

19. The method of claim 12, wherein the laser off scan process and the laser on scan process further comprises conducting optical monitoring scan at an output of a transmit optical amplifier in optical communication with an optical translator through which the optical signal travels.

20. The method of claim 12, wherein the newly fibered connection comprises an end terminal.

21. The method of claim 12, wherein determining an association corresponding to the optical signal comprises determining a point to point connection corresponding to the optical signal.

22. The method of claim 12, wherein the newly fibered connection passes through a network element having more than one line therethrough and wherein the laser off scan process is repeated to determine an association for each of the more than one lines.

23. The method of claim 12, further comprising generating an error condition if the optical channel detected during the laser off scan process or not detected during the laser on scan process.

24. A method for autoprovisioning a newly fibered end terminal in an optical line system, comprising:
  receiving a client signal in an optical translator of the end terminal;
  reading an apparatus code of the optical translator to determine a channel wavelength of the client signal and determining a corresponding optical multiplexer port therefrom;
  determining if a previously existing association exists for the client signal in a system association database;
  turning a laser in the optical translator off and conducting an optical spectrum analysis on an optical output of a line side of the end terminal to determine if the client signal is present;
  turning the laser in the optical translator on and conducting an optical spectrum analysis on the optical output of a line side of the end terminal to determine if the client signal is present; and
  determining a point to point fiber connection association corresponding to the client signal from results of the optical spectrum analysis.

* * * * *